United States Patent [19]
Johnson

[11] Patent Number: 5,809,068
[45] Date of Patent: Sep. 15, 1998

[54] PCMCIA MODEM

[75] Inventor: Greg Johnson, New Brighton, Minn.

[73] Assignee: Multi-Tech Systems, Inc., Mounds View, Minn.

[21] Appl. No.: 302,618

[22] Filed: Sep. 8, 1994

Related U.S. Application Data

[63] Continuation of Ser. No. 247,058, May 20, 1994, abandoned.

[51] Int. Cl.$^6$ .......................................... H04J 3/22
[52] U.S. Cl. ................................ 375/222; 379/93
[58] Field of Search ....................... 375/222, 219, 375/258, 257; 327/83, 91; 329/352; 379/93

[56] References Cited

U.S. PATENT DOCUMENTS

| | | | |
|---|---|---|---|
| 3,973,089 | 8/1976 | Puckette | 179/170 |
| 4,007,334 | 2/1977 | McDonald | 179/15 |
| 4,074,081 | 2/1978 | Humm | 179/84 R |
| 4,380,687 | 4/1983 | Stewart | 179/2 BC |
| 4,394,543 | 7/1983 | Keiper, Jr. et al. | |
| 4,555,599 | 11/1985 | Hackett-Jones et al. | 179/170 R |
| 4,560,834 | 12/1985 | Huft | |
| 4,577,064 | 3/1986 | Huft et al. | |
| 4,649,548 | 3/1987 | Crane | 375/7 |
| 4,670,870 | 6/1987 | Hewinson et al. | 370/38 |
| 4,760,595 | 7/1988 | Arai | |
| 4,804,957 | 2/1989 | Selph et al. | 375/7 |
| 5,099,204 | 3/1992 | Wheatley, III | 330/279 |
| 5,127,046 | 6/1992 | Malm | 379/98 |
| 5,323,461 | 6/1994 | Rosenbaum et al. | |
| 5,333,196 | 7/1994 | Jakah | |
| 5,408,401 | 4/1995 | Miyazaki | 363/21 |
| 5,444,704 | 8/1995 | Henderson et al. | 375/222 |

OTHER PUBLICATIONS

AT&T Microelectronics catalog entitled *Modem Designer's Guide*, dated Oct. 25, 1993.
Zilog User's Manual entitled *Z86017 PCMCIA Adaptor Chip—Solutions for PCMCIA Applications*.
AT&T Microelectronics catalog entitled *AT&T HSM144xD Data Pump Chip Sets* (14,400 bits/s Data/FAX, Parallel Data Mode, ROM Code MG); dated May 1993.
Zilog catalog entitled *Preliminary Product Specification—Z80182 Zilog Intelligent Peripheral (ZIP™)*, dated 1992.
"PCM–COM422" *PCMCIA Data Acquisition, Control, and Communications*, vol. 8, p. 16.
"PCM–COM485" *PCMCIA Data Acquisition, Control, and Communications*, vol. 8, p. 17.

*Primary Examiner*—Wellington Chin
*Assistant Examiner*—Jean B. Corrielus
*Attorney, Agent, or Firm*—Schwegman, Lundberg, Woessner & Kluth, P.A.

[57] ABSTRACT

A modem having reduced power dissipation and temperature compensation. The modem includes a data pump, a telephone line interface, memory and a controller, connected to the memory and the data pump, for executing program code to control transfers between the data pump and a telephone line. The telephone line interface includes a current-limited loop holding circuit in order to limit power dissipated in the modem due to DC loop current. The current-limited loop holding circuit includes a constant current source in series with a DC loop holding circuit.

8 Claims, 18 Drawing Sheets

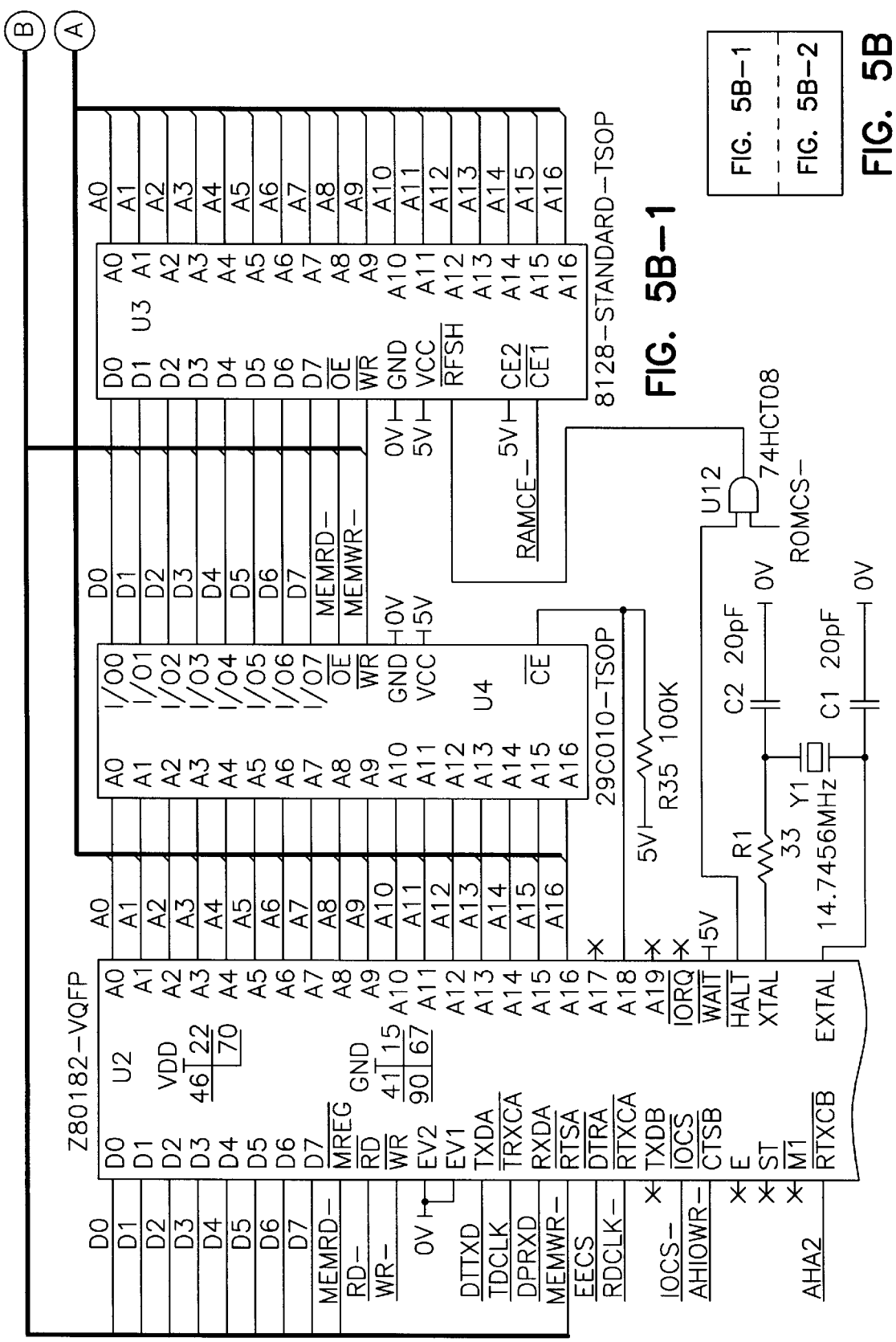

PCMCIA MODEM

This is a continuation of application Ser. No. 08/247,058, filed May 20, 1994, now abandoned.

FIELD OF THE INVENTION

The present invention relates to communications systems and in particular to a modem which can be inserted into a PCMCIA slot in order to permit data transfer over the public telephone lines.

BACKGROUND

Laptop and notebook computers have become increasingly important business tools. Their portability translates into increased convenience and flexibility in performing work outside the typical office environment. This portability does, however, come at a price; these systems have, for the most part, been difficult to integrate into the day-to-day office environment, achieving connectivity only through the addition of bulky peripheral devices with separate power supplies.

The Personal Computer Memory Card International Association (PCMCIA) standard was created in order to provide a more streamlined approach to connectivity. For instance, the PCMCIA standard has been adopted by a number of networking adapter and communications vendors as a way for users to add LAN or modem communications without having to carry bulky equipment. The standard establishes a credit-card-size package which can be plugged into a 68-pin host adapter socket built into the computer. Each package maintains the same slot width and depth but the thickness can differ (there are currently three different slot thicknesses: Type I (3.3 mm), Type II (5.0 mm) and Type III (10.5 mm).

According to the PCMCIA standard, a host adapter resident in the personal computer handles communication with the PCMCIA device. Two levels of communication protocol are defined. First, a basic software interface termed Socket Services handles transfers between the computer processor and the peripheral device as a series of function calls. At a more abstract level, operating system-specific software termed Card Services manages the peripheral device's resources (such as memory and interrupts).

The PCMCIA format provides a relatively small volume for device components This concentration of active and passive devices tends to drive up the heat generated per unit volume of the PCMCIA device. In addition, since PCMCIA cards are typically fully encased, dissipation of that heat is difficult. Therefore, these cards tend to operate over a wider temperature range than do their full-size counterparts. These heat-related problems are particularly troubling in systems such as modems where data transfer rates can be undermined by rapid changes in operating temperature. Therefore, there is a need in the art for a PCMCIA-based modem which will minimize power dissipation while compensating for the adverse effects of the power dissipated within the device.

SUMMARY

The present invention is a PCMCIA modem. The modem includes a data pump, a telephone line interface, memory and a controller, connected to the memory and the data pump, for executing program code to control transfers between the data pump and a telephone line. The telephone line interface includes an isolation transformer having an impedance which changes as a function of temperature and means for changing the response of the receiving and/or transmitting sections of the telephone line interface to compensate for changes in the transformer impedance over temperature.

According to another aspect of the present invention, method and apparatus are described for reducing the current drawn from the public telephone network. A current-limited loop holding circuit is connected in series with overvoltage protection and polarity protection circuits in order to limit power dissipated in the modem due to DC loop current. The current-limited loop holding circuit includes a constant current source in series with a DC loop holding circuit.

BRIEF DESCRIPTION OF THE DRAWINGS

In the drawings, where like numerals refer to like components throughout the several views.

DETAILED DESCRIPTION OF THE PREFERRED EMBODIMENTS

In the following detailed description of the preferred embodiment, reference is made to the accompanying drawings which form a part hereof, and in which is show by way of illustration specific embodiments in which the inventions may be practiced. These embodiments are described in sufficient detail to enable those skilled in the art to practice the invention, and it is to be understood that other embodiments may be utilized and that structural changes may be made without departing from the spirit and scope of the present inventions. The following detailed description is, therefore, not to be taken in a limiting sense, and the scope of the present inventions is defined by the appended claims.

Figure 1:
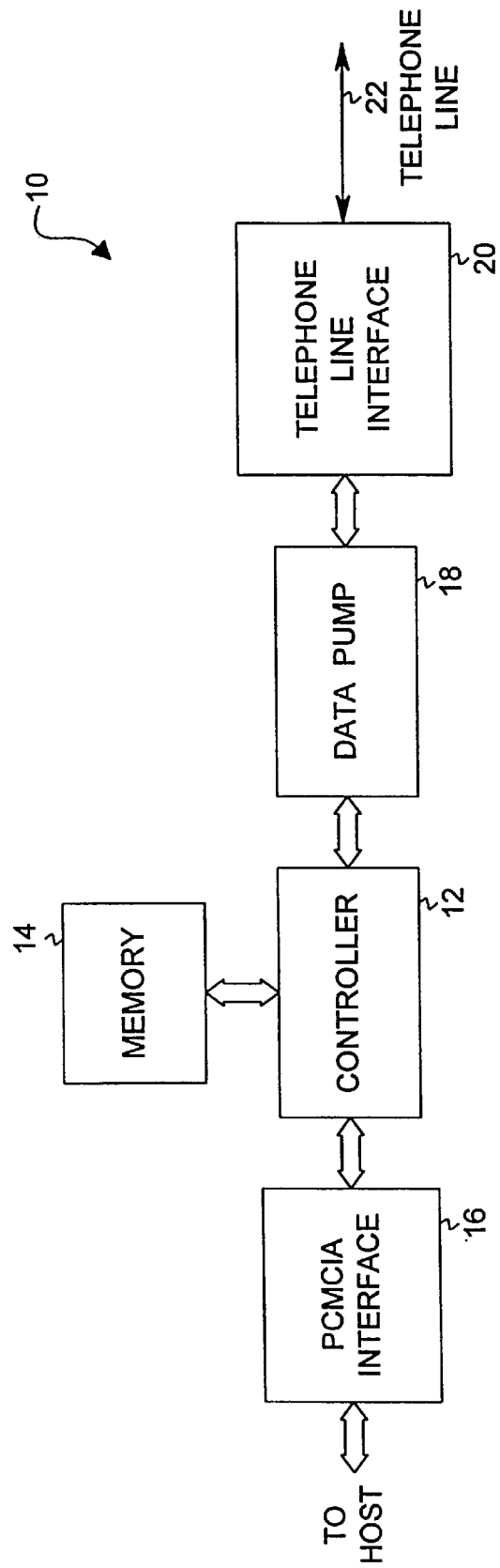
FIG. 1 is a top-level block diagram of a modem according to the present invention.

A top-level block diagram of a modem 10 is shown in FIG. 1. In the modem of FIG. 1, controller 12 is connected through PCMCIA interface 16 to the host computer and through data pump 18 and telephone line interface 20 to the public telephone system. Controller 12 executes program code resident in memory 14 to control transfers between data pump 18 and the public telephone system over telephone line 22 and to control transfers between controller 12 and a host processor (not shown) over PCMCIA interface 16. Modem 10 is manufactured as a PCMCIA card which can be plugged into a PCMCIA slot in any host computer.

Data pump 18 includes a digital telephone coder-decoder (CODEC) and a digital signal processor (DSP) for communicating through telephone line interface 20 to the public telephone system. The data pump DSP performs functions such as modulation, demodulation and echo cancellation to communicate over telephone line interface 20 using a plurality of telecommunications standards including FAX and modem protocols. Controller 12 controls data pump 18 directly.

Figure 5A:
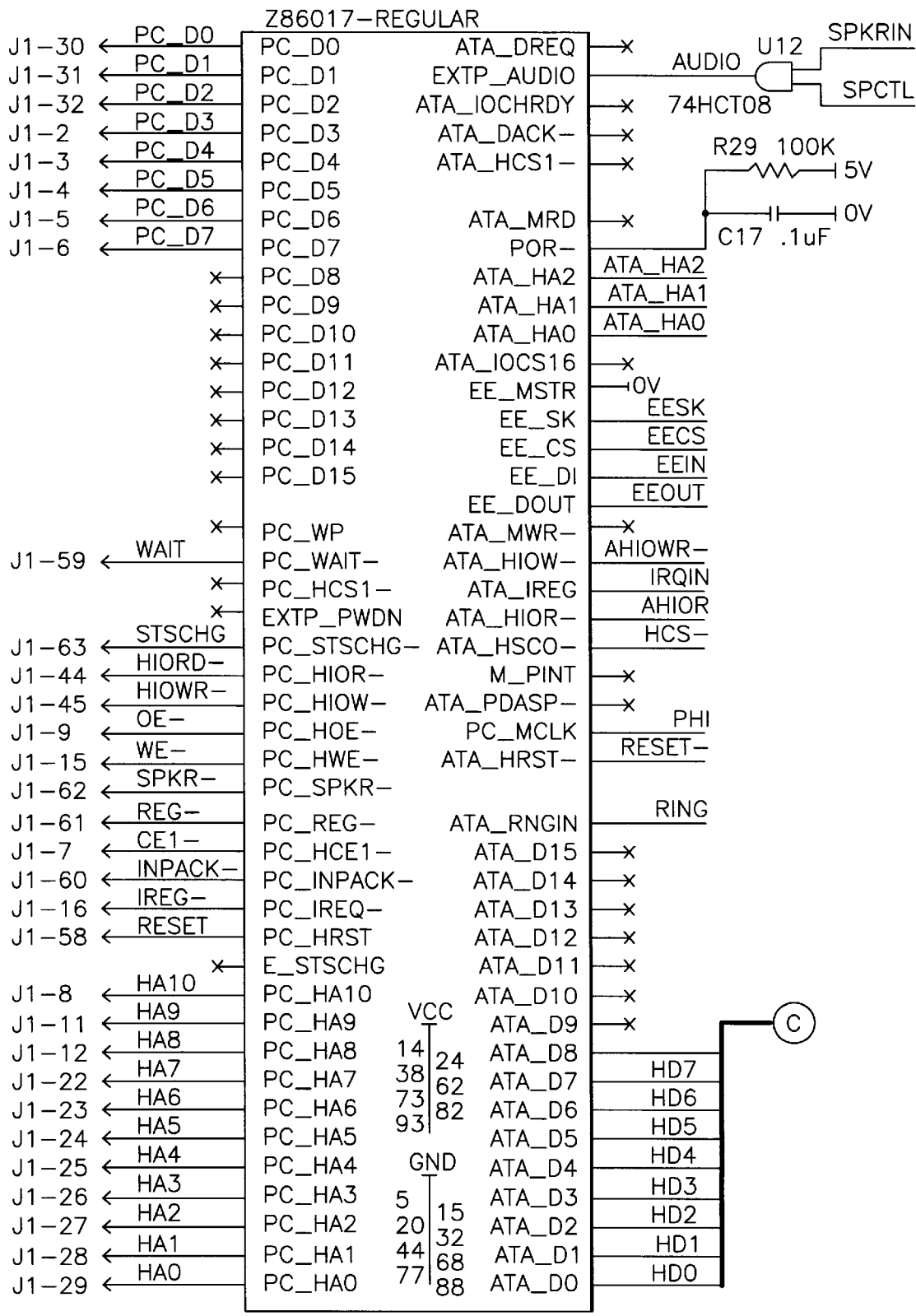
FIGS. 5A–C are block diagrams of one embodiment of the PCMCIA interface, controller and memory of FIG. 1.
Figures 2, 5B:
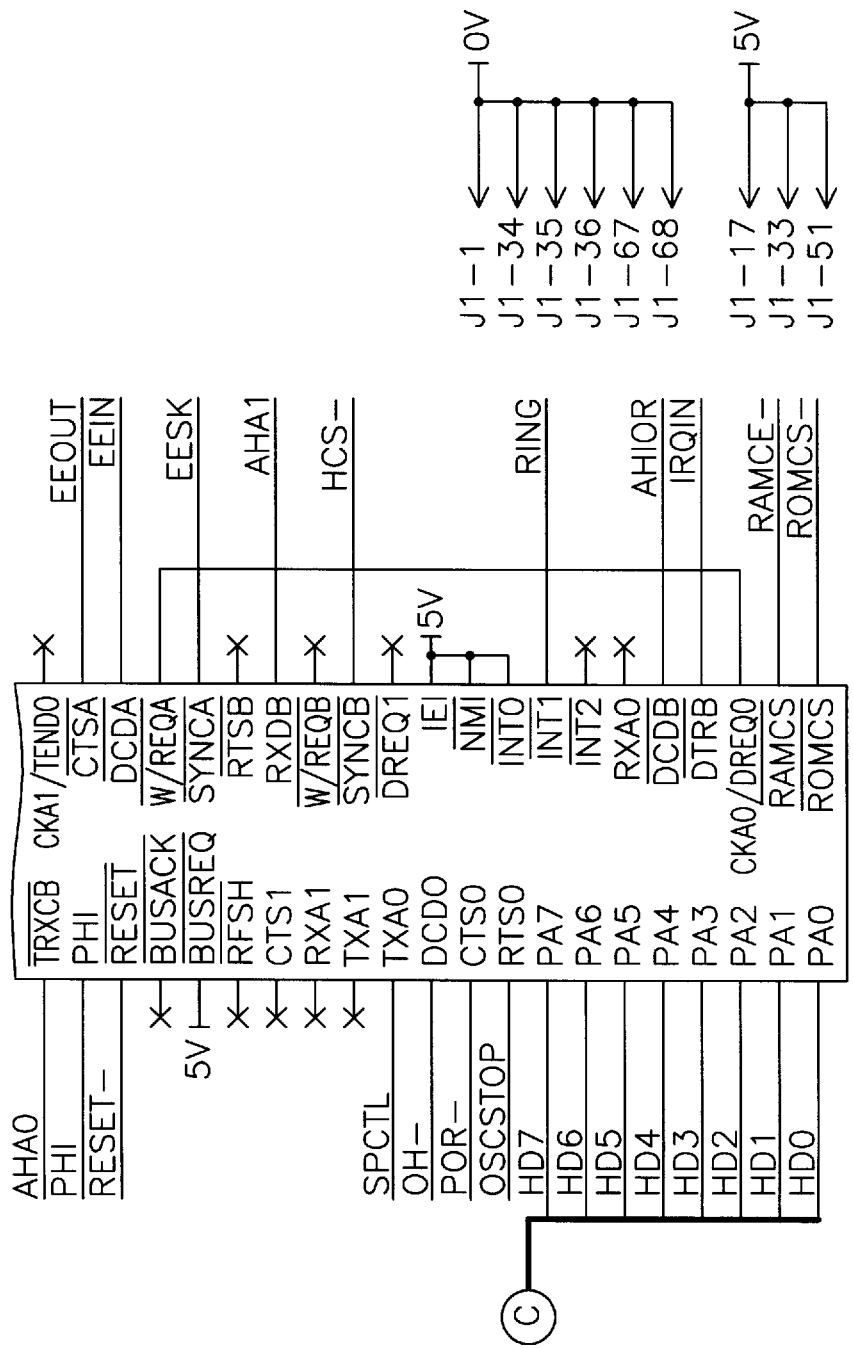
Figure 5C:
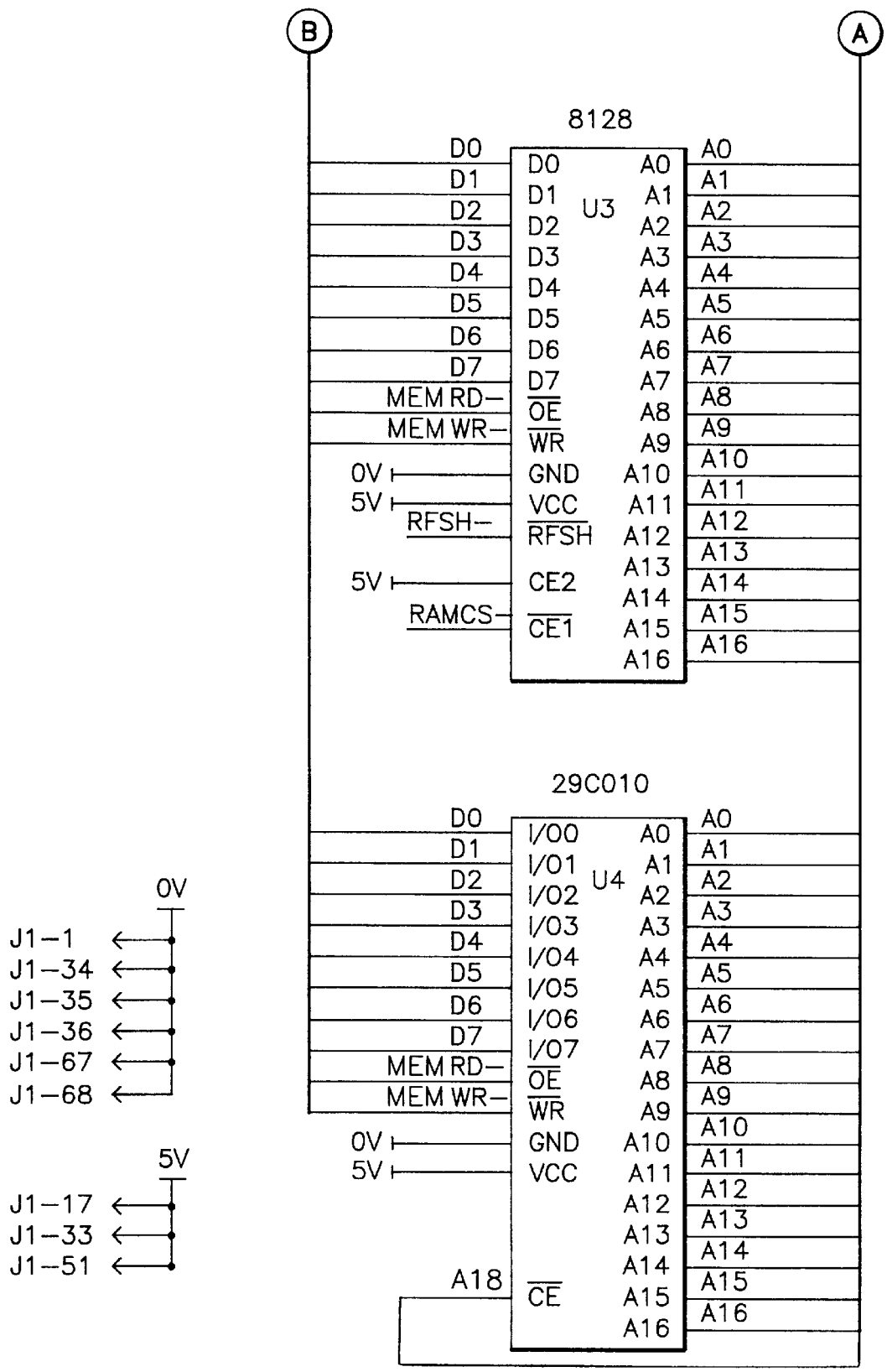

In one embodiment, memory 14 includes a RAM circuit U3 and a programmable and electrically erasable read only memory or Flash PROM circuit U4 (see, e.g. FIG. 5C). In such an embodiment, flash PROM circuit U4 includes non-volatile memory in which the executable control programs for controller 12 are stored.

Figure 2:
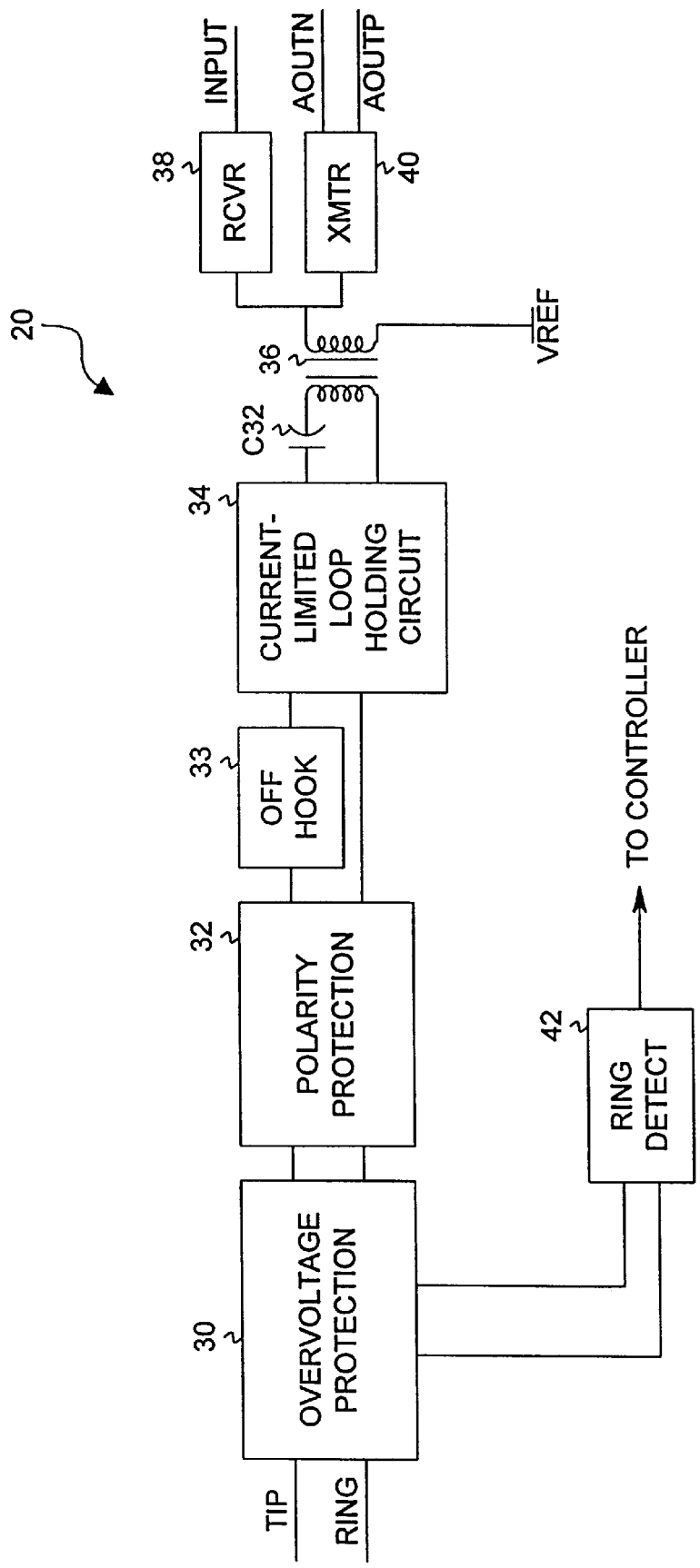
FIG. 2 is a block diagram of a telephone interface circuit which can be used within the modem of FIG. 1.

Telephone line interface 20 is the interface to the public telephone network. In one embodiment, as is shown in FIG. 2, interface 20 includes an overvoltage protection circuit 30 used to prevent damage to voltage sensitive devices within modem 10, a polarity protection circuit 32 used to rectify a signal received from the telephone network, an off-hook switch 33, a current-limited loop holding circuit 34, an isolation transformer 36, a receiving circuit 38 and a transmitting circuit 40. Off-hook switch 33 operates under control of controller 12 to close the loop with the local exchange. Receiving circuit 38 receives a signal from telephone line 22 and conditions that signal in conjunction with CODEC U7. Transmitting circuit 40 receives a signal from CODEC U7 and amplifies that signal before passing the amplified signal to telephone line 22. In one particular embodiment, telephone line interface 20 also includes a ring detect circuit 42 used to notify controller 12 of the presence of a ring signal on telephone line 22.

Modem 10 can be used to connect over telephone phone lines 22 to fax machines, to personal computers and to networks of personal computers. Those skilled in the art will readily recognize the wide variety of communication interconnections possible with the present system by reading and understanding the following detailed description.

Current-limited loop holding circuit 34 limits the DC loop current drawn from telephone line 22. When modem 10 goes off-hook to dial or answer, it draws direct current to indicate this action to the public telephone switching network. The amount of current drawn is typically between twenty and one hundred twenty milliamperes. This DC loop current is typically passed through a resistor (such as the 100 ohm resistor R9 shown in FIG. 6B) where it is transformed into heat. Therefore, if the current drawn from telephone line 22 can be limited to less than 35 milliamperes, up to 720 mW of power can be eliminated from the power dissipated by modem 10 ($P=I^2R$). There are lower limits to such current limitations. For instance, research has indicated that some PBXs don't reliably detect an off-hook when the loop current drawn is less than 22 milliamperes; in such systems, a loop current limit of 32 milliamperes gives more reliable performance. In one embodiment, as is shown in FIG. 3, circuit 34 is formed by placing a constant current source 50 in series with a DC holding circuit 52.

Figure 3:
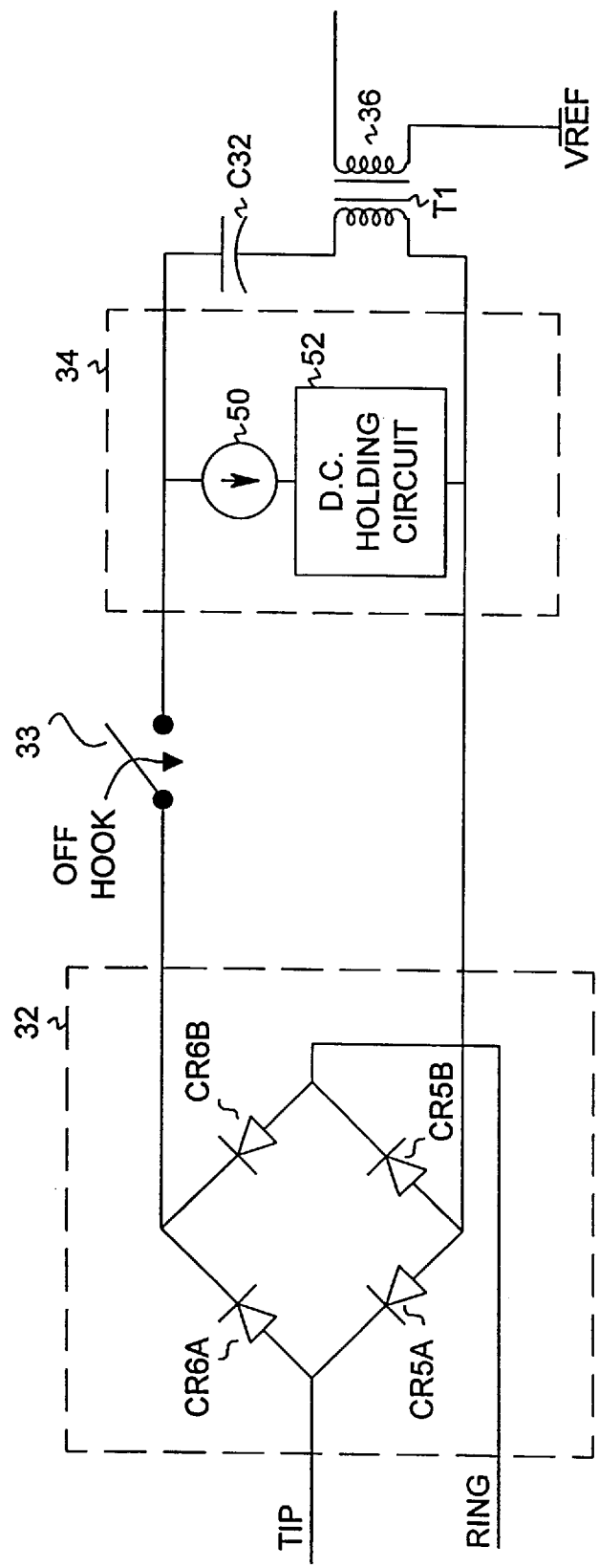
FIG. 3 is a more detailed block diagram of the polarity protection and loop holding circuits of the telephone interface circuit of FIG. 2.

In the embodiment of circuit 34 shown in FIG. 3, a constant current source 50 is placed in series with a DC holding circuit 52 in order to limit the amount of direct current drawn to thirty-four milliamperes. This limits the current drawn from telephone lines 22, permitting the use of smaller, lower power components in DC holding circuit 52. In one embodiment, constant current source 50 is formed by voltage regulator Q2 and resistor R27 (see FIG. 6B). In such an embodiment the voltage across the resistor R27 controls the current drawn by circuit 34.

In FIG. 3, the TIP and RING signals are rectified in polarity protection circuit 32. In the embodiment of polarity protection circuit 32 shown in FIG. 3, a full wave rectifier ensures that signals received from telephone line 22 are placed in the proper polarity.

Figure 4:
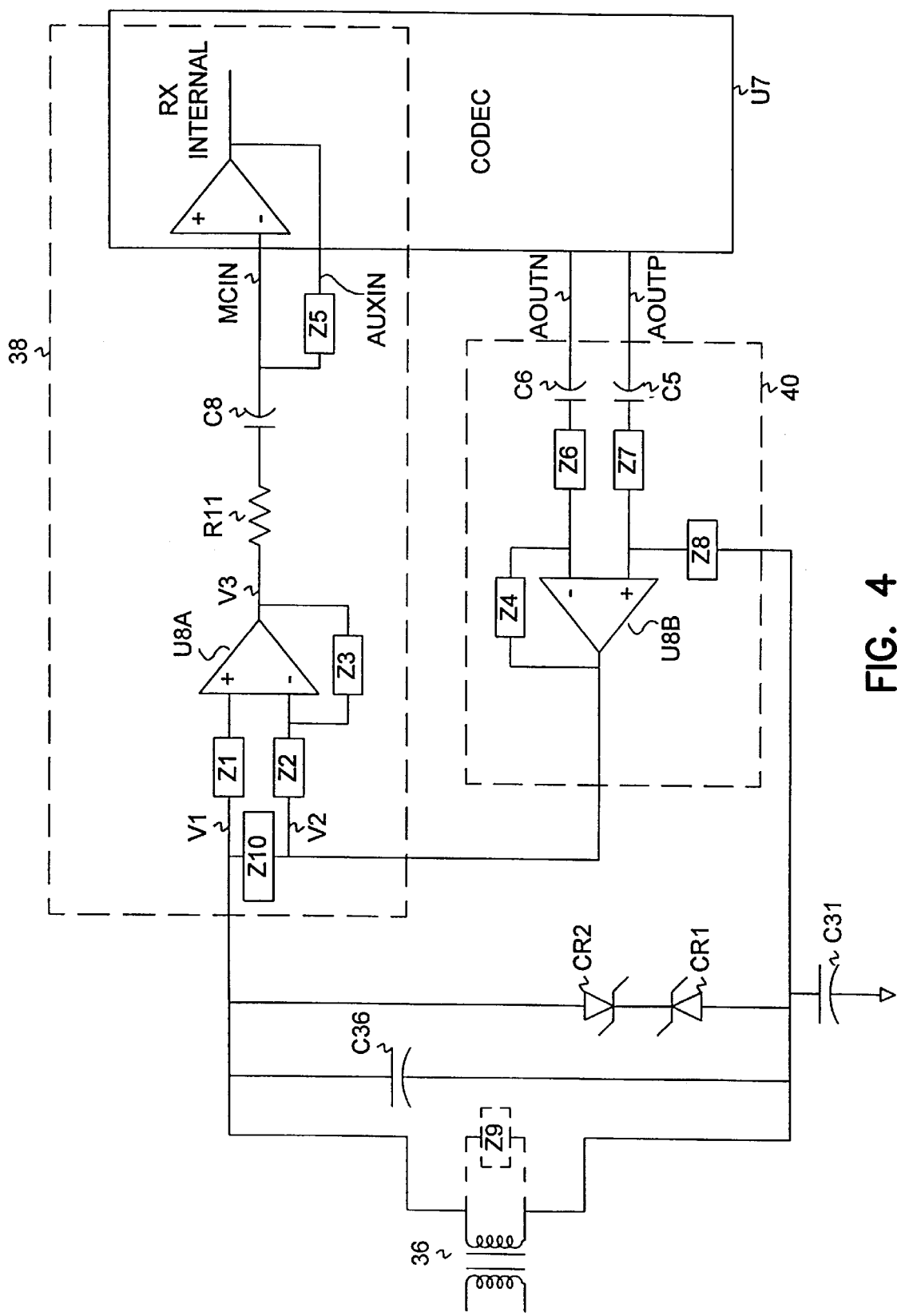
FIG. 4 is a more detailed block diagram of the receive and transmit circuits of FIG. 2.

FIG. 4 is a more detailed block diagram of the receiving and transmitting circuits of FIG. 2. Receiving circuit 38 and transmitting circuit 40 are generally tuned to cancel out as much of the transmitted signal from the receive path as possible. As can be seen in FIG. 4, in modem 10 the correctly polarized, overvoltage protected TIP and RING lines are passed through an isolation transformer 36 before being attached to receive circuit 38 and transmit circuit 40. Transformer 36 is the source of another heat related problem which manifests itself due to the size restraints of the PCMCIA form factor. In the circuit of FIG. 4, if the impedance Z9 of transformer 36 changes, the amount of transmit signal that is cancelled from the receive path also changes. The PCMCIA form factor presents some of the worst case conditions for transformer impedance changes. For instance, the size of the PCMCIA package forces the designer to use a smaller transformer than would be preferred The smaller transformer has a smaller mass (less heat dissipation) and higher resistance windings (due to smaller diameter winding wires). Therefore, its impedance can vary greatly with temperature. In addition, the PCMCIA card provides a small unventilated space and limited power management features. These characteristics make for a package which heats up rapidly and operates at a high temperature.

In a typical modem, a digital signal processor (DSP) is performs the echo cancellation functions used to achieve a higher data transfer rate. If the temperature of the device rises or falls gradually, the DSP can compensate for the resulting gradual changes in transformer impedance through echo cancellation. If, however, the temperature of the transformer changes more rapidly, echo cancellation alone cannot keep up with the changes and the DSP is forced to negotiate to lower speeds or even retrain to measure the new characteristics. This process takes up valuable time that could be used to transmit data Research indicated that the combination of the smaller transformer 36 and the decreased heat dissipation inherent to PCMCIA modem 10 resulted in an inordinate amount of time spent retraining Temperature compensating circuits can be added to modem 10 to compensate for changes in transformer impedance over temperature.

The use of temperature compensation circuits to offset changes in transformer impedance due to temperature will be discussed in the context of the receiving and transmitting circuits shown in FIG. 4. In FIG. 4, the receive path is the difference between V1 and V2.

V2 is the transmit signal and V1 has both transmit and receive components. The amount of transmitted signal which appears at V1 is determined mainly by a voltage divider made up of Z10 and Z9. Since Z9 is increasing with temperature, the amount of transmit signal appearing across Z10 is decreasing and therefore the transmit signal at V3 decreases with temperature. Since data pump 18 is only capable of tracking very slow changes in the transmit level, this change causes problems in error handling and, therefore, data transfer rate. This effect can be reduced at a number of points in the circuit. For example, in one embodiment, a negative temperature coefficient thermistor is used as part of Z2 to change the gain and ratio between V1 and V2 that appears at V3. Notice that V2 is constant, but V1 is increased with tempt.) Decreasing Z2 increases the overall gain of the amplifier U8A, which appears at V3.

V3 will be:

$$\frac{z3}{z2} v2 + \left(1 + \frac{z3}{z2}\right) v1$$

In another embodiment, the same result is obtained by using a component that has a positive temperature coefficient in Z3.

In yet another embodiment, the resistance of Z10 is increased in order to keep V1 constant and the V1/V2 ratio constant.

Finally, by either increasing Z4 and Z8 with temperature or decreasing Z6 and Z7 with temperature, the actual gain of the transmit signal can be changed. This will also keep the amount of transmit signal appearing at V3 constant.

R11, C8 and Z5 are not critical to the temperature compensation. They provide additional overall gain adjustment so that the DSP signal level readings correspond to real values on the phone line. With the codec and DSP shown in FIGS. 6A–C, it is generally assumed that the receive signal is attenuated by 6 dB so that 0 dB on the phone line should measure −6 dB at the MCIN input.

Figure 6A:
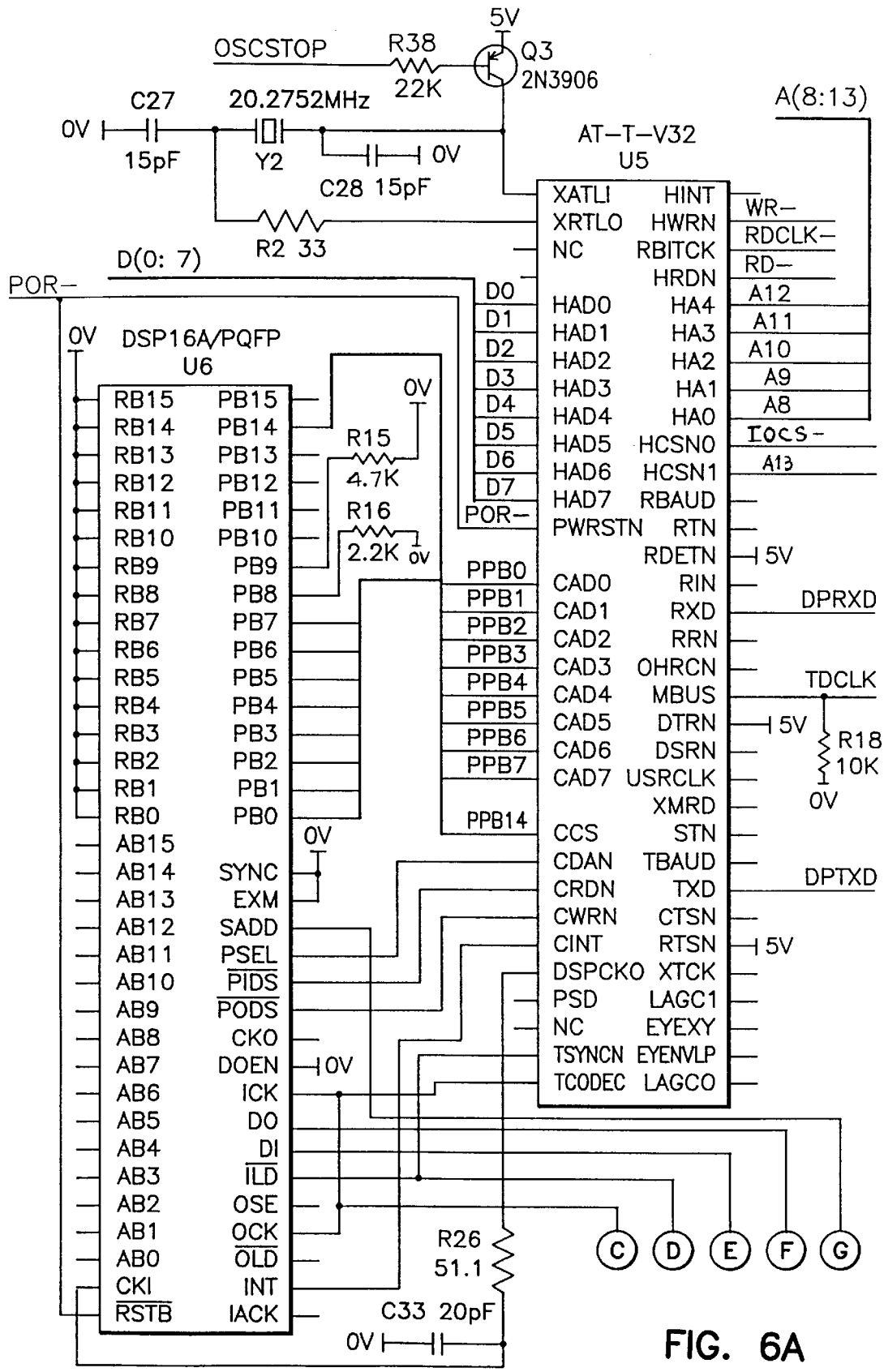
FIGS. 6A–C are block diagrams of one embodiment of the data pump and telephone interface circuit of FIG. 1.

An application of the above temperature compensation is described next. In the receiving circuit embodiment shown in FIG. 6C, a negative temperature coefficient thermistor is used to change the receive amplifier's characteristics over temperature to compensate for the increase in transformer impedance. In FIG. 6C, a network consisting of a 10 kΩ resistor RA and a 30 kΩ negative temperature coefficient thermistor RB placed in parallel is placed in series with a resistor R23. In the embodiment shown the resistance of the circuit containing RA, RB and R23 decreases in an approximately linear fashion with the increase in operating temperature. This causes the gain of the circuit containing amplifier U8A to increase with temperate and keeps the relationship between transmitting circuit 40 and receiving circuit 38 in balance. The addition of the thermistor network did result in a change in the values of R4 and R23. At the same time, however, the gain ratios remained approximately the same.

In one transmitting circuit embodiment, a negative temperature coefficient thermistor is used to change the transmitting amplifier's characteristics over temperature.

DETAILED ELECTRICAL SCHEMATIC DIAGRAMS

Detailed electrical schematic diagrams of one embodiment of modem 10 are shown in FIGS. 5A–C and 6A–C. The electrical connections between the electrical schematic diagrams are through the designators listed next to each wire. For example, on the right side of FIG. 5B, address lines A0–A19 are attached to an address bus for which the individual electrical lines may appear on other pages as A0–A19 or may collectively be connected to other schematic diagrams through the designator "A" in the circle connected to the collective bus. In a like fashion, other electrical lines designated with symbols such as RING- on the lower left-hand side of FIG. 5B may connect to other schematic diagrams using the same signal designator RING-.

Figure 6B:
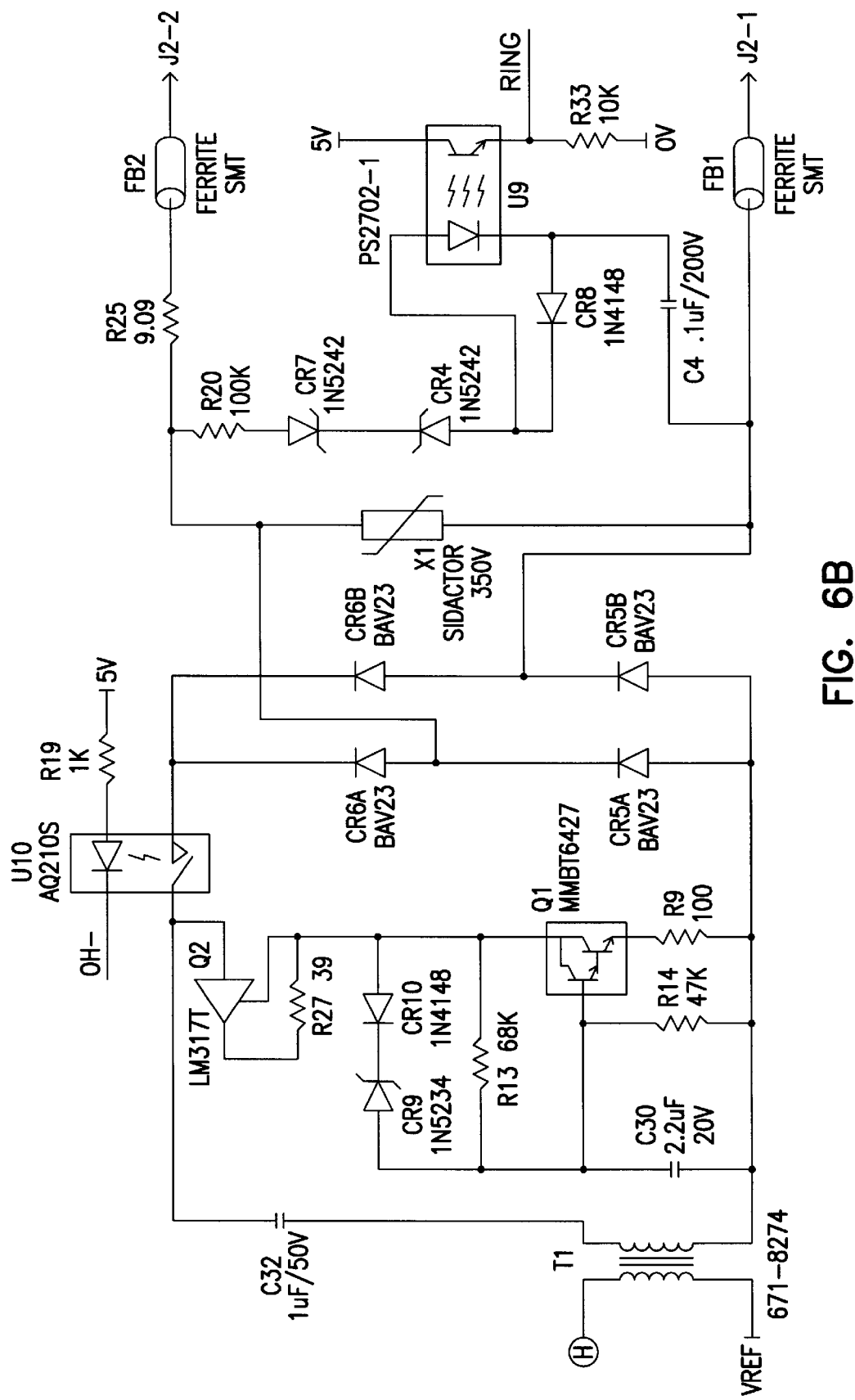
Figure 6C:
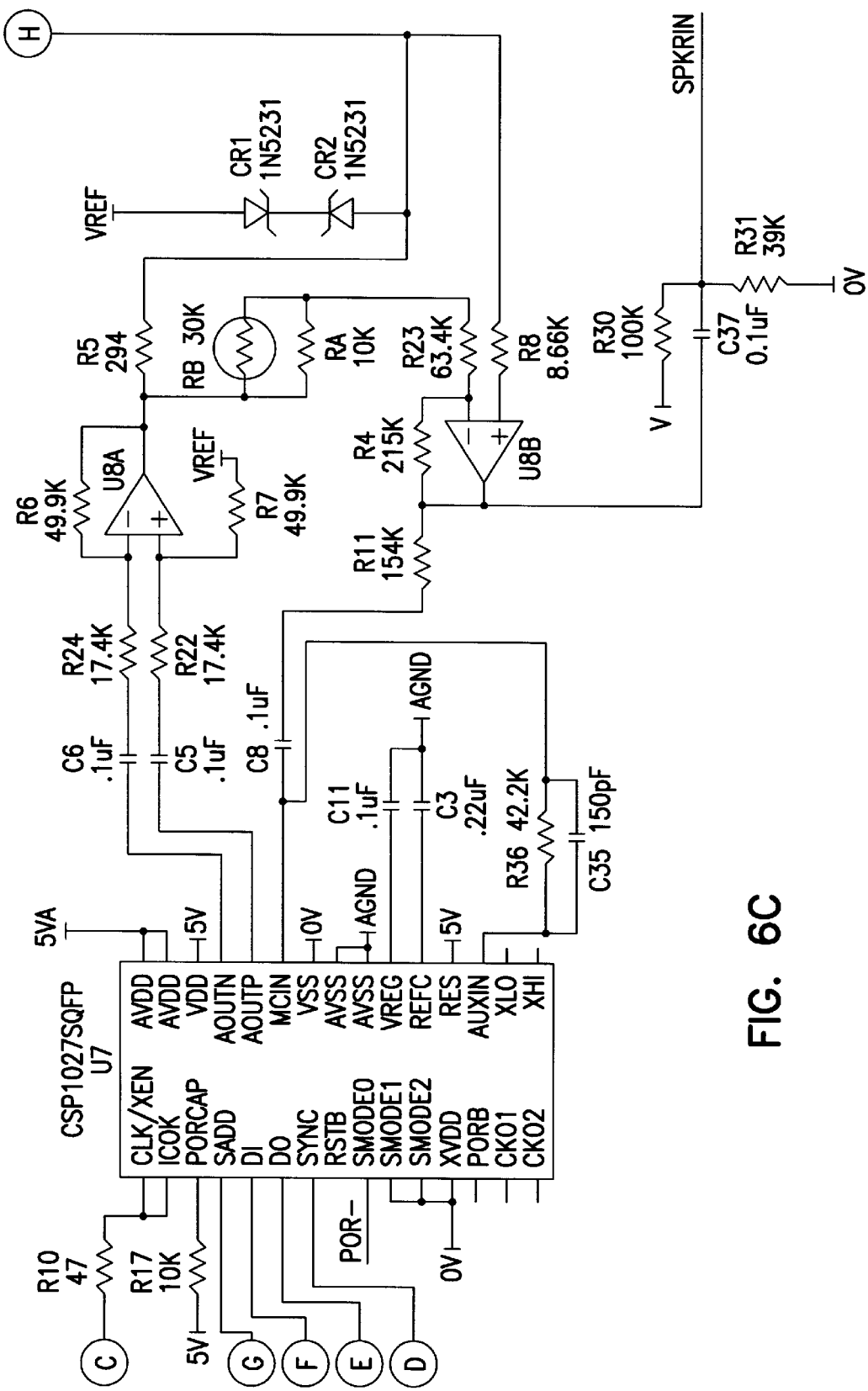

Beginning with the electrical schematic diagram of FIGS. 6B and 6C, one embodiment of telephone line interface 20 is shown. The connection to telephone line 22 in the preferred embodiment is through a standard six-pin modular RJ-11 jack. In the schematic diagram of FIG. 6B, only the tip and ring connections of the first telephone circuit of the RJ-11 modular connector are used. Ferrite beads FB1 and FB2 are placed on the tip and ring wires of the telephone line connections to reduce high frequency or RF noise that may radiate from telephone line. In the embodiment shown, overvoltage protection circuit includes SIDACTOR X1. The incoming telephone line is full wave rectified by the full wave bridge comprised of diodes CR6A, CR6B, CR5A and CR5B. In addition, ring detect circuit 42 is connected across incoming telephone line 22. In ring detect circuit 42, optical isolator U9 (part model number PS2702-1) senses the ring voltage threshold when it exceeds the breakdown voltages on zener diodes CR4 and CR7. In the embodiment shown, DC Holding circuit 52 consists of a transistor Q1 along with the associated discrete resistors. DC holding circuit 52 provides the current path or current loop on the telephone line needed to seize the line. Solid state relay U10 provides the off-hook function of off-hook switch 33. The signal conditioning sections of telephone interface circuit 20 are physically isolated from the rest of the system by transformer T1.

Although the telephone line interface 20 shown in FIG. 2 is designed for U.S. standards, it should be obvious that interface 20 can be customized to interface to other telephone standards.

CODEC chip U7 (shown in FIGS. 4 and 6C), interface chip U5 (shown in FIG. 6A) and digital signal processor (DSP) chip U6 (shown in FIG. 6A) comprise a data pump chip set manufactured and sold by AT&T Microelectronics (the AT&T HSM144xD Data Pump Chip Set). A detailed description of the operation of these three chips in direct connection and cooperation with one another is described in the publication entitled "AT&T V.32bis/V.32/FAX High-Speed Data Pump Chip Set Data Book" published by AT&T Microelectronics, December 1991, which is incorporated herein by reference. Further information is available in "AT&T HSM144xD Data Pump Chip Set Data Sheet" published by AT&T Microelectronics, May 6, 1993, which is also incorporated herein by reference. This AT&T data pump chip set provides the core of an integrated, two-wire full duplex modem which is capable of operation over standard telephone lines or leased lines. The chip set performs all A/D, D/A, modulation, demodulation and echo cancellation of all signals placed on or taken from the telephone line, performs DTF tone generation and detection, signal analysis of call progress tones, etc., conforms to the telecommunications specifications in CCITT recommendations V.32bis, V.32, V.22bis, V.22, V.23, V.21 and is compatible with the Bell 212A and 103 modems. Speeds of 14,400, 9600, 4800, 2400, 1200, 12,000 and 300 bits per second are supported. The transmission of information on the telephone line from CODEC U7 is through the embodiments of receiving circuit 38 and transmitting circuit 40 shown in FIG. 6C.

Controller 12 is shown in FIGS. 5A–C. In one embodiment of the present system, controller 12 comprises an eight-bit microcontroller chip U2. In one such embodiment, microcontroller chip U2 is a Z80182 microprocessor manufactured by Zilog, Inc. of Campbell, Calif. The Zilog Z80182 eight-bit microprocessor operates at an internal clock speed determined by means of an external crystal Y1, which in the preferred embodiment, is a 14.7456 MHz crystal. The crystal circuit includes capacitors C1 and C2 which are 20 pF capacitors and resistor R1 which is a 33 ohm resistor. The design guidelines and operation procedures for the Z80182 can be found in "Z80182 Zilog Intelligent Peripheral Controllers Preliminary Product Specification" published February 1992 by Zilog, Inc, which guidelines and procedures are incorporated herein by reference. In particular, the product specification describes the operation of the microcontroller core and of the 16550 MIMIC interface.

The memory chips which operate in conjunction with microcontroller chip U2 are shown in FIG. 5C. The connections A, B correspond to the connections to the address and data buses, respectively, found on FIG. 5B. Memory chip U4 is a read-only memory (ROM) chip which is electrically reprogrammable in circuit. This programmable ROM, typically referred to as a flash PROM, holds the operating code and operating parameters for the present system in a non-volatile memory. Upon power-up, microcontroller chip U2 executes the program code that is stored in the flash PROM U4. In the preferred embodiment, RAM chip U3 is a pseudostatic RAM which is a dynamic RAM with a built-in refresh. Those skilled in the art will readily recognize that a wide variety of memory chips may be used and substituted for pseudo-static RAM U3 and flash PROM U4 without departing from the scope of the present invention.

The interface between controller 12 and the personal computer is through PCMCIA interface 16. In the embodiment shown in FIGS. 5A–C, PCMCIA interface 16 is implemented with a Z86017 PCMCIA Interface chip U1 manufactured by Zilog, Inc. of Campbell, Calif. The design guidelines and operation procedures for the Z86017 PCMCIA Adaptor Chip can be found in "Z86017 PCMCIA Adaptor Chip User's Manual" published in 1993 by Zilog, Inc, which guidelines and procedures are incorporated herein by reference.

Power Saving Features

Referring again to FIG. 6A, the interface chip U5, discussed in detail above is shown. Also shown in the upper left portion of FIG. 6A is power saving circuitry which is incorporated into the present modem system to enable the practical implementation of a small, lightweight and easily portable PCMCIA modem suitable for use, for example, with a laptop computer.

In order to conserve power, vanous power saving features are provided which allow the present modem system to be put in a low power, or "sleep" mode. In sleep mode the power to the modem is greatly reduced. There are two main power saving features in the sleep mode. First, additional circuitry has been added in the preferred embodiment to allow additional power savings to be realized. Second, the AT&T data pump chip set has a built in low power mode.

The AT&T data pump chip set described in detail above has the ability to be put into a low power mode. The data pump chip set enters sleep mode automatically after a reset, a disconnect or by user command. The chip set automatically wakes up when a ring signal or host command is received. When in low power mode, the CODEC bit clock TCODEC generated by interface chip U5 is slowed to 115 kHz. The built-in sleep mode of the AT&T data pump chip set is described in more detail in the aforementioned publication entitled "AT&T V.32 bits/V.32/FAX High-Speed Data Pump Chip Set Data Book" published by AT&T Microelectronics, December 1991.

In addition to the power saving sleep mode provided by the AT&T data pump chip set, the present invention provides an additional power saving feature. Circuitry is provided such that external clock oscillator Y2 can also be put in sleep mode (disabled). This results in a significant power savings as the oscillator would consume power unnecessarily when the modem is not in use. Crystal Y2 is a 20.275 MHZ crystal which is used in conjunction with an internal oscillator provided on interface chip U5. The internal oscillator is described in the above listed documentation for interface chip U5.

In one embodiment, the built-in sleep mode of the Z80182 is used to further reduce power. The built in SLEEP mode of the Zilog Z80182 is described in more detail in the aforementioned publication Z80182 Zilog Intelligent Peripheral Preliminary Product Specification.

Functional Description of Upgrade Control Programs

The preferred modem system includes two control programs which control the remote in-circuit reprogramming of system firmware, a flash control program and a boot control program. The flash control program runs in the host PC and receives updated operating code downloaded from a bulletin board. The updated code is downloaded to the host PC in the form of Intel HEX files. The flash control program processes the HBEX files and creates the packets containing the updated code which are actually sent to the modem Each packet contains a field containing the packet length, the address at which to store the updated code, the actual program data and a checksum. The boot control program running in the modem checks that the packet was correctly transmitted and programs the updated operating code at the address specified in the address field of the packet.

In summary, the flash control programs control the host PC side of the process of in-circuit reprogramming of flash PROM U4. The boot control program controls the modem side. As described above, flash PROM U4 is an in-circuit programmable and electrically erasable read only memory. As is well known to those of skill in the art, these memory chips allow in-circuit reprogramming of the operating code and parameters which are stored in the flash PROM chip U4. Although the present modem system is described with respect to a particular flash PROM U4, it shall be understood that any in-circuit reprogrammable memory configuration could be used without departing from the scope of the present invention.

Before flash PROM U4 is assembled in the modem circuit, the boot control program is burned, or programmed into flash PROM U4 using conventional PROM programmers and programming techniques.

When a bug fix, enhancement or other new release of system operating code becomes available, the flash control program is used to control the remote loading and processing of operating code downloaded over telephone line from a central bulletin board. The boot control program receives the updated code from the host PC over the serial port and controls in-circuit reprogramming of the new operating code into flash PROM U4.

The field programmable feature of the modem system of the present invention has several advantages. Because a user can remotely load new operating code over a remote telephone connection, code updates can be obtained immediately as soon as they are available instead of waiting for new pas to be shipped. In addition, no physical removal or replacement of parts is required thus significantly reducing the chance of breakages. Further, no special tools are required to remove and replace parts, and no special PROM programming equipment is required to reprogram the memory chips. Finally, the need for a technician to travel to the remote site to perform the upgrade is avoided thus significantly reducing costs associated with the upgrade.

Detailed descriptions of the flash control program and boot control program will now be given. The illustrative embodiments of the flash control program and boot control program described and shown herein is with special reference to a PC-based DOS operating system It shall be understood, however, that the present invention is in no way limited to a DOS operating system. The preferred modem system can also be used with a UNIX-based operating system, MacIntosh operating system, or any of a number of operating system platforms simply by customizing the user interface to run on the desired operating system.

Detailed Description of Flash Control Program

Figure 7:
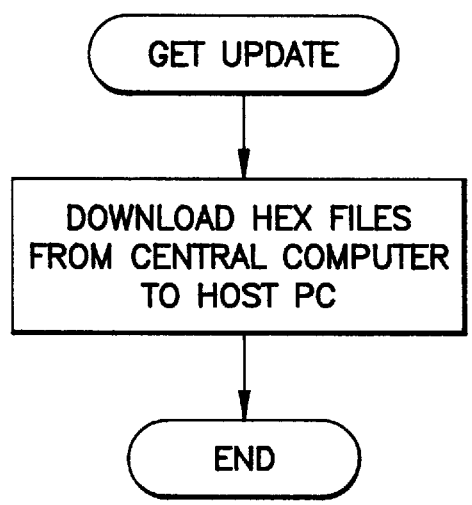
FIG. 7 shows a flow diagram of the process for downloading the HEX files containing the updated operating code from a bulletin board to the host PC.

The flash control program is used to control the reprogramming of updated operating code and parameters into the flash part of the modem The updated operating code is distributed to the user according to the procedure shown in FIG. 7. To get the update, HEX files containing the updated operating code are downloaded over a phone line from a computer bulletin board to the host PC. The HEX files are preferably in the Intel MCS-86 HEX format. This is an industry standard for HEX files.

The HEX files contain entirely ASCII characters and include three record types: Data Record, End Record and Extended Address Record. The formats of the three record types are described in detailed at page 27 of the User Manual for the Gtek EPROM programmer model 9000, dated 01-11-88, which is incorporated herein by reference, and are as follows:

| Byte number | Contents |
|---|---|
| | Data Record |
| 1 | Colon(:) |
| 2–3 | Number of binary data bytes |
| 4–5 | Load address, high byte |
| 6–7 | Load address, low byte |
| 8–9 | Record type, must be "00" |
| 10–x | Data bytes, 2 ASCII-HEX characters |
| x+1–x+2 | Checksum, two ASCII-HEX characters |
| x+3–x+4 | carriage return (CR), line feed (LF) |
| | End Record |
| 1 | Colon(:) |
| 2–3 | Record length, must be "00" |
| 4–7 | Execution address |
| 8–9 | Record type, must be "01" |
| 10–11 | Checksum |
| 12–13 | CR, LF |
| | Extended Address Record |
| 1 | Colon(:) |
| 2–3 | Record length, should be "02" |
| 4–7 | Load address field, should be "0000" |
| 8–9 | Record type, must be "02" |
| 10–13 | USBA-this number multiplied by 16 is the new load offset address For our use only the first digit is used as the 64K bank offset value |
| 14–15 | Checksum |
| 16–17 | CR, LF |

Figure 8A:
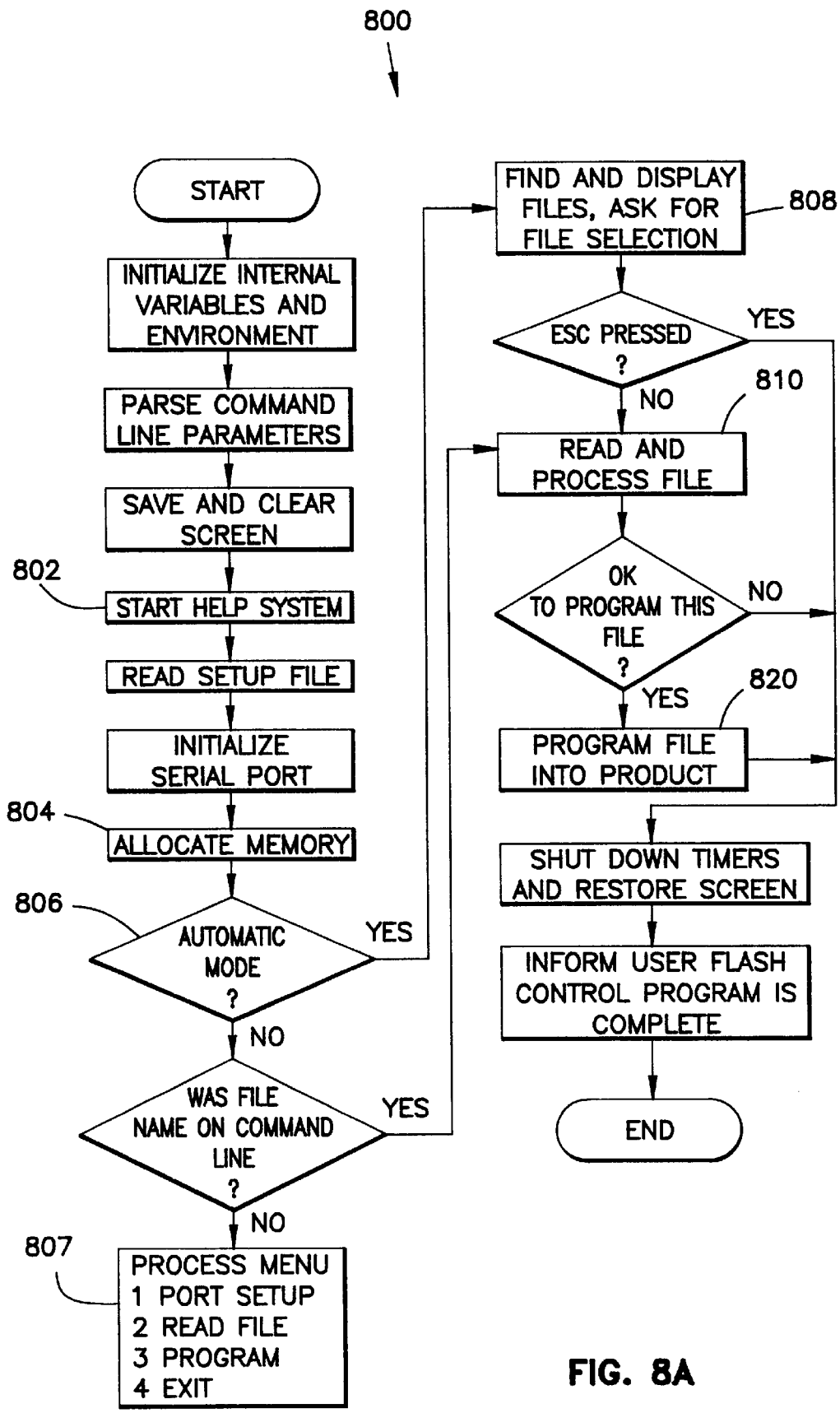
FIGS. 8A–8C show a flow diagram of the upgrade control program from the perspective of the host PC.

FIG. 8A shows a detailed flow diagram of the flash control program 800. The beginning of the flash control program 800 is shown. First, the internal environment and variables are initialize The preferred flash control program 800 accepts either command line parameters or can be run in a menu driven mode. The present state of the user interface screen is saved and cleared while the field upgrade control program is running. The screen is saved for later restoration after the reprogramming is completed.

Flash control program 800 continues at control block 802, which starts the help system. The help system reports on-screen status messages to the user during various stages of reprogramming. At times information may be requested from the user. Also, error messages and possible courses of action are displayed when appropriate.

Next, flash control program 800 reads the setup file to determine which serial port the modem is connected through, the appropriate baud rate and other necessary setup information. The serial port is then initialized according to the setup information obtained.

Control block 804 allocates a 128 kbyte memory buffer in the host PC. This memory buffer is used to store processed HEX files containing the updated operating code to be programmed into the flash PROM in the modem. Processing of the HEX files is described in detail below with respect to FIG. 8B.

If "AUTOMATIC MODE" is set at query 806, flash control program 800 automatically runs the user through the reprogramming procedure. However for certain manufacturing and R&D purposes, it is desirable for the user to have more control over the reprogramming procedure. Thus, automatic mode can be disabled. When automatic mode is disabled, the flash control program checks whether the name of the HEX file to be programmed is present on the command line. If not, a user "PROCESS MENU" will appear on the screen at control block 807 with the choices "PORT SETUP," "READ FILE," "PROGRAM," or "EXIT." The user can then select the functions to be performed. If the HEX file name was on the command line, the flash control program continues with READ AND PROCESS FILE routine 810 described in detail below.

Otherwise, in AUTOMATIC MODE, flash control program 800 continues, at the top right portion of FIG. 8A with control block 808. Here all HEX files present in the host PC are found and their names displayed on-screen. The user chooses the name of the file to be programmed into the modem. If the desired file is not listed, the user can press the ESC key to exit the program.

Although the bytes of each record in the HEX files downloaded from the bulletin board are sequential, the HEX records themselves are in no particular order within the file. The file must therefore be processed and sorted into a format which can be programmed into the modem. READ AND PROCESS FILE routine 810 reads the standard Intel HEX files stored in the host PC and performs the necessary HEX file processing.

Figure 8B:
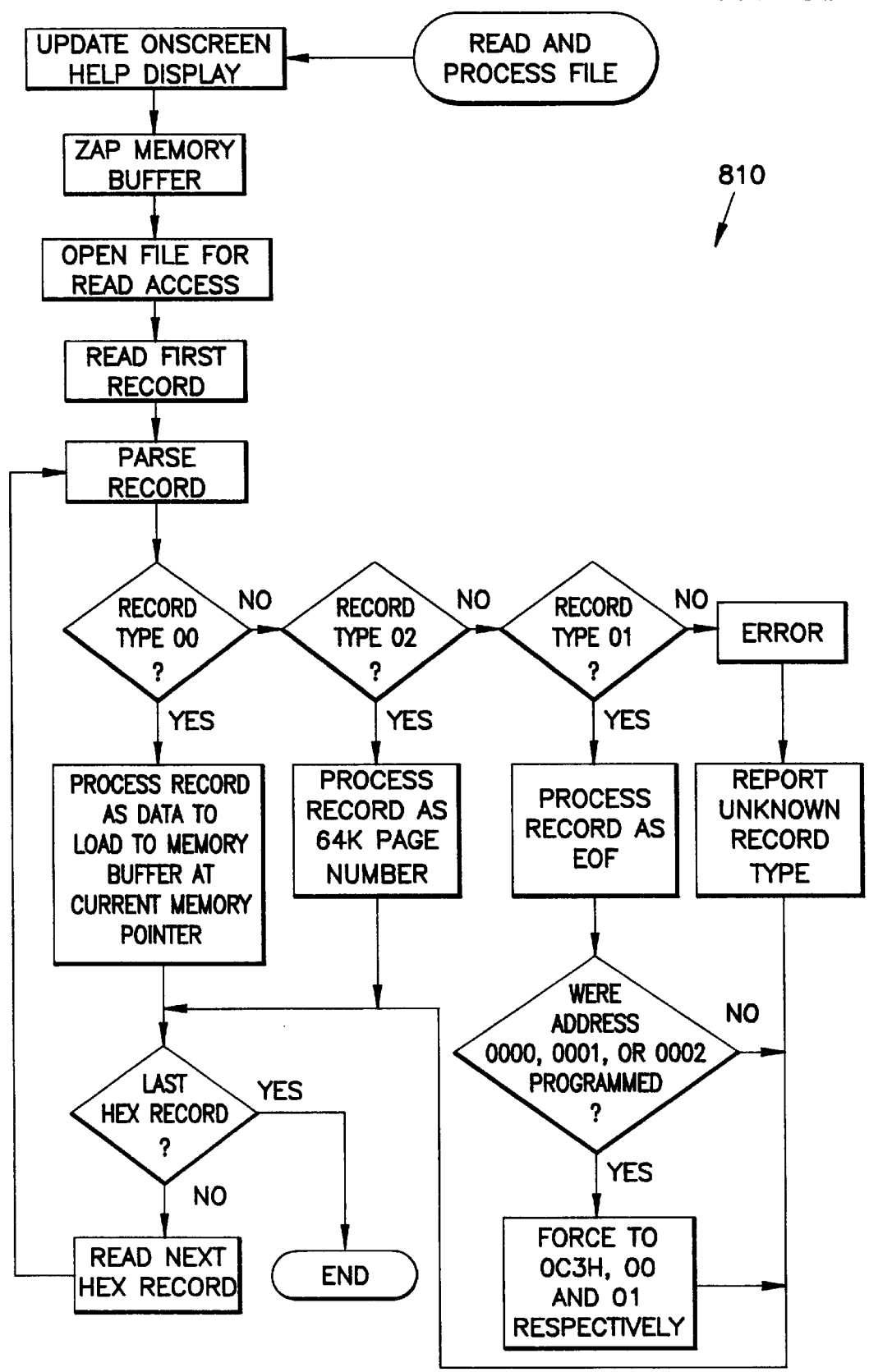

FIG. 8B shows a detailed flow diagram of the READ AND PROCESS FILE routine 810. The purpose of READ AND PROCESS FILE routine 810 is to convert the ASCII HEX characters contained in the HEX records to a binary format appropriate for programming into flash PROM U7. Routine 810 begins with an update of the on-screen help display. Next, the memory buffer is "zapped", i.e., set to all FF hex (all 1 binary). This corresponds to the erased state of flash PROM U7.

Next the HEX file is opened for read access and the first HEX record is read. The record is then parsed to check syntax and to determine the record type indicated by the record type field of each HEX record as described above.

If the record is type 0 the record is a data record. The record is processed as a data to be loaded in the memory buffer at the current memory pointer, where the pointer is the current 64 k page plus the address supplied in the record. After the data is converted from a ASCII text to binary and stored to the memory buffer, the pointer is incremented to the next available space in the buffer.

Record type 02 indicates an extended address record. The information in these records is converted from ASCII text to binary and processed as a 64 k page number to be added as an offset to all of the following records until a new record type 02 is reached.

Record type 01 indicates an End of File (EOF) record. If address 0000, 0001 or 0002 were programmed, these addresses are forced to 0c3h, 00 and 01, respectively. This is the code for a jump to boot control area, rather than the normal modem code. This step ensures that the boot control area of the flash part is not corrupted.

READ AND PROCESS FILE routine 810 reads through the records in the HEX file until all records have been read, processed and stored into the memory buffer in the host PC. After the last record has been process, the READ AND PROCESS FILE routine 810 is completed.

Referring again to FIG. 8A, after READ AND PROCESS FILE routine 810 is completed, flash control program 800 queries the user ensure that the correct file to be programmed into the modem has been identified. If not, the program exits. Otherwise, flash control program 800 continues with PROGRAM FILE INTO PRODUCT routine 820.

Figure 8C:
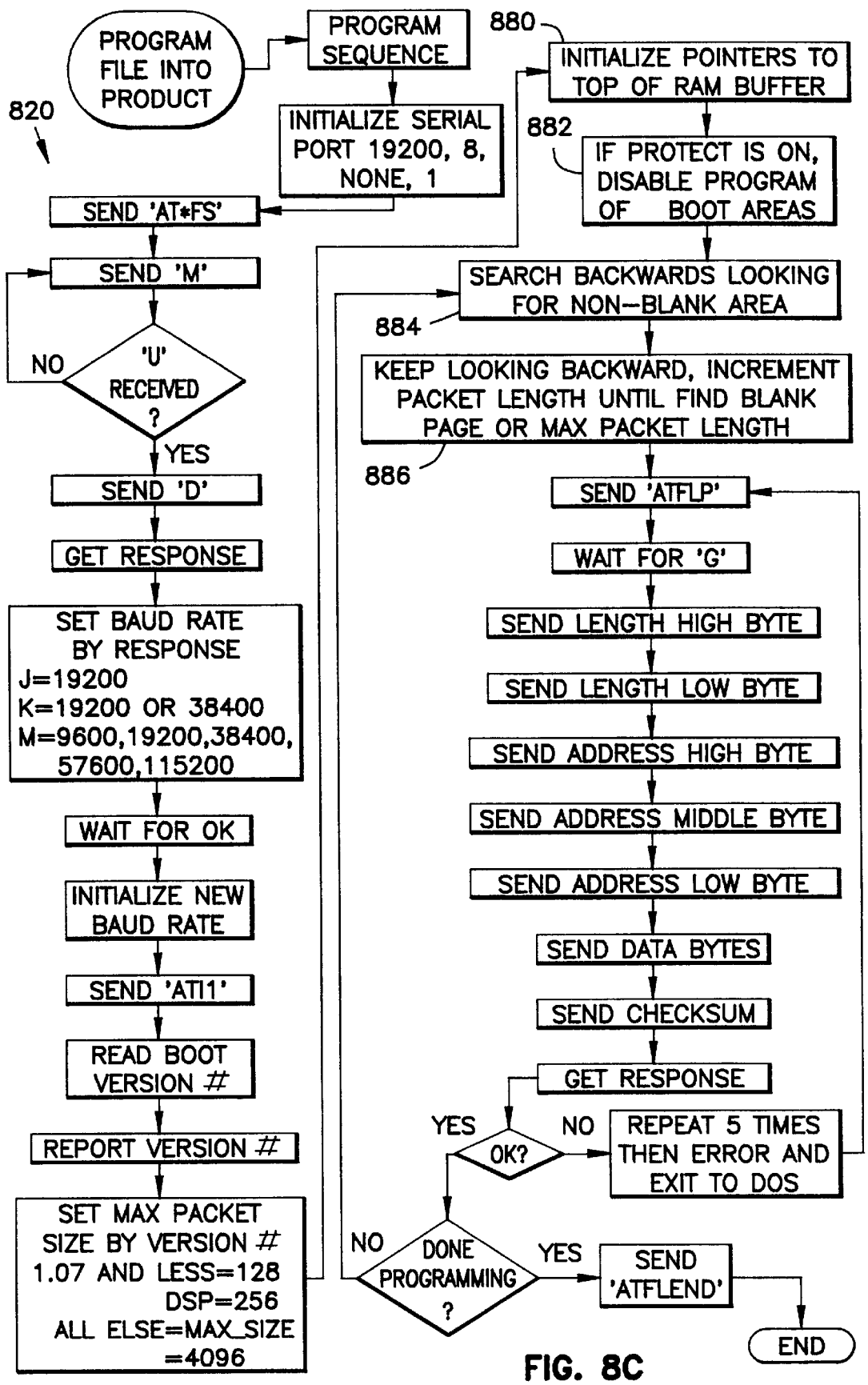

FIG. 8C shows a detailed flow diagram of PROGRAM FILE INTO PRODUCT routine 820. The present modem system uses the well-known and widely used AT command set. As is well-known in the art, the AT command set allows a user to control a modem by entering commands through a computer keyboard. The AT command set can be used to direct the modem to perform functions such as accessing a telephone line, taking the receiver off-hook, dialing and hanging up. The AT command set can also be used for more intelligent functions such as downloading or uploading files. Many of these more intelligent functions of the AT command set are used in the present modem system, as described in more detail below. The AT command set is used in the PROGRAM FILE INTO PRODUCT ROUTINE 820.

A general overview of the PROGRAM FILE INTO PRODUCT routine 820 will now be described with reference to Table 1 and Table 2. The handshaking procedure which negotiates the transfer baud rate between the host PC and modem, which was discussed above is shown in Table 1. The AT command set shown and described in Table 2 is used to control the modem. All data sent is 8 bits, no parity and 1 stop bit.

TABLE 1

| Host | Modem |
|---|---|
| | Power up or AT*FS triggers execution of the boot code. |
| Send 'M's at 19200 baud | Responds with 'U' at 19200 baud if 'M's received within 30 ms of power up or AT*FS command. Otherwise jumps to main code on time out. |
| Send 'D' at 19200 baud | If 'D' received within 300 ms of when 'U' sent, then modem responds with: 'J': can receive at 19200 baud 'K': can receive at 19.2k or 38.4k baud 'M': can receive at 9.6k, 19.2k; 38.4k, 57.6k or 115.2k baud Otherwise jumps to main code on time out. |
| If 'J' then 19200 baud Otherwise may send 'I': 9600 baud 'J': 19200 baud 'K': 38.4k baud 'L': 57.6k baud | |

TABLE 1-continued

| Host | Modem |
|---|---|
| 'M': 115.2k baud | |
| Configure for negotiated speed. | Configure for negotiated speed. |

Referring now to FIG. 8C, the serial port is initialized to 19200 baud, and is set for packets of 8 bits, no parity and I stop bit. AT*FS is a special command which tells the modem to jump to address zero, which is equivalent to powering on the modem. At that point, the host PC and modem engage in a handshaking procedure to negotiate the transfer baud rate, shown in tabular form in Table 1 above. Pursuant to this handshaking procedure, the host PC starts sending capital 'M's to the modem at an initial baud rate of 19200. The host PC. sends 'M's until it receives a 'U' response from the modem. Timeout is controlled by the modem side as described below with respect to FIG. 9A. The host PC continues to send 'M' at 19200 baud until a 'U' is received.

In the normal case, the modem will respond with a 'U' within 30 milliseconds. At that point, the PC will send back a 'D' and the modem responds within 300 ms with either 'J', 'K' or 'M', depending on the modem version and the corresponding baud rate at which it can run. If the modem responds with a 'J', the computer assumes a baud rate of 19200.

If the modem responds with a 'K', the computer can choose 38400 or 19200 baud. A response of 'M' means that the modem can be run at 9600, 19200, 38400, 57600 or 115.2 k baud. The PC sends I, J, K or M to set the speed. The host PC and modem then each initialize the negotiated baud rate and configure accordingly.

The modem is now prepared to receive the AT command set as shown in Table 2:

TABLE 2

| Command | Description |
|---|---|
| ATIx, where x = 1, 2, or 3 | special codes |
| ATFLEND | exit program and jump to main code |
| ATFLP | program a packet |

Next, the host PC sends an ATI1 command. The ATI1 command contains the boot control program version number. The version number determines the packet size, which can range from 128 bytes to 4 k byte packet size depending on the version number received. The host PC then sets the max packet size according to the version number received.

Next, as shown in control box 880 in the top right of FIG. 8C, the host PC initializes pointers to the top of the RAM buffer which was allocated in control box 804 shown on FIG. 8A, and in which the processed and sorted updated operating code to be programmed into the flash PROM in the modem is stored.

Once the pointers are initialized to the top of the RAM buffer in the host PC, control block 882 commands the PC to check a software protect switch which when enabled prevents overwriting of the program area of the flash PROM in which the boot control program is stored, or which when disabled allows portions of the boot control program to be updated. For normal use the software protect switch is enabled to prevent erroneous overwriting of the boot control program area. However, for R&D or manufacturing purposes it may be necessary to update or reprogram the boot control area. The software protect switch thus provides a software "back door" which allows access to the area of the flash PROM where the boot control program is stored.

Referring again to FIG. 8C, the host PC begins to build a packet which will be sent to the modem over the serial port. In the control blocks 884 and 886 the host PC builds a packet by searching through the HEX files in the RAM buffer, searching for contiguous non-blank pages. A HEX file blank page is defined as a page programmed to all FF. Whenever a non-blank page is found the packet length is incremented. Variable length packets may be sent in sizes up to the specified max packet length determined by version number as described above. Once a blank page is found or the max packet length is reached, the packet is complete and ready to be transferred to the modem over the PCMCIA interface.

The packet built by the process shown in control blocks 884 and 886 includes a header portion and a data portion. The header portion includes a length field created by the host PC as it builds of the packet. The header portion also includes an address field which contains the physical starting address of where the data is to be placed in the flash PROM. The data portion includes the updated program data bytes and an XOR'd checksum. The packet format is shown in Table 3:

TABLE 3

| Packet Field | Field Length |
| --- | --- |
| Length High | 1 byte |
| Length Low | 1 byte |
| Address High | 1 byte (only lowest order 4 bits used, upper 4 bits set to 0) |
| Address Middle | 1 byte |
| Address Low | 1 byte |
| Program Data | x bytes |
| XOR'd checksum | 1 byte |

After the packet is built, the host PC sends the command ATFLP to the modem, the command for program a packet. Upon receipt of the ATFLP command, the modem responds with a 'G'. The host PC then transmits the data packet pointed to by the RAM buffer pointer.

After the packet is received by the modem, the modem generates its own checksum based on the data received and compares it to the checksum sent by the host PC. If they are equivalent, the modem responds with 'OK', and the received code is programmed into the flash PROM address pointed to by the Address High, Middle, and Low bytes. Otherwise the modem responds with an error.

The host PC will run through the programming loop, searching through the RAM buffer, creating packets and sending packets to the modem until the programming is complete or until 5 consecutive errors occur.

After the host PC has sent all the packets, as determined by the DONE PROGRAMMING query, the host PC sends an ATFLEND command to signal that program g is completed. After the file has been programmed, an exit routine, shown in FIG. 8A is run in which timers are shut down and the state of the screen is restored. The user is informed that the program is completed or was terminated due to error. The program then jumps to the normal modem code.

Detailed Description of the Boot Control Program

Figure 9A:
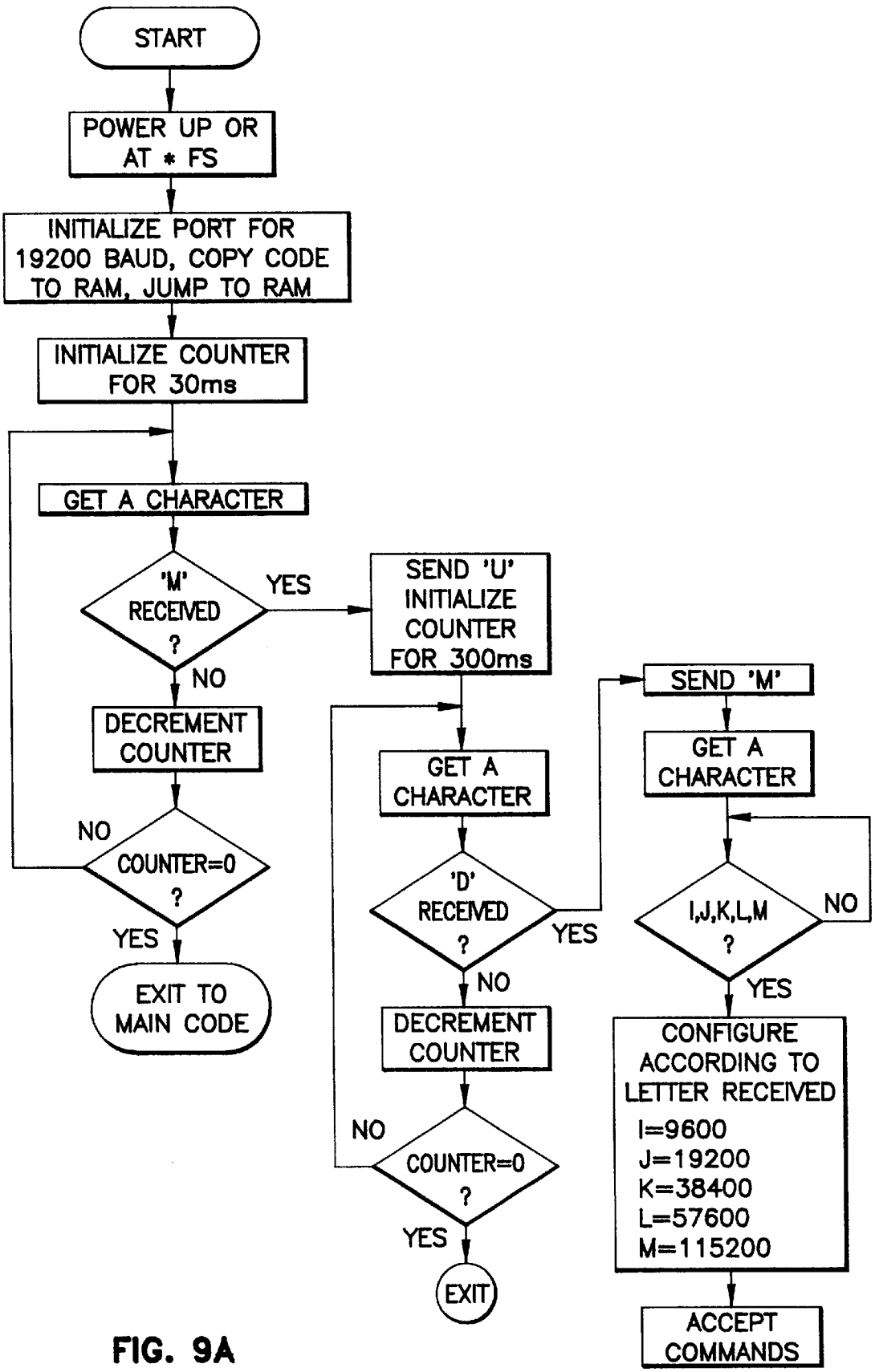
FIGS. 9A–9D show a flow diagram of the upgrade control program from the perspective of the modem.
Figure 9B:
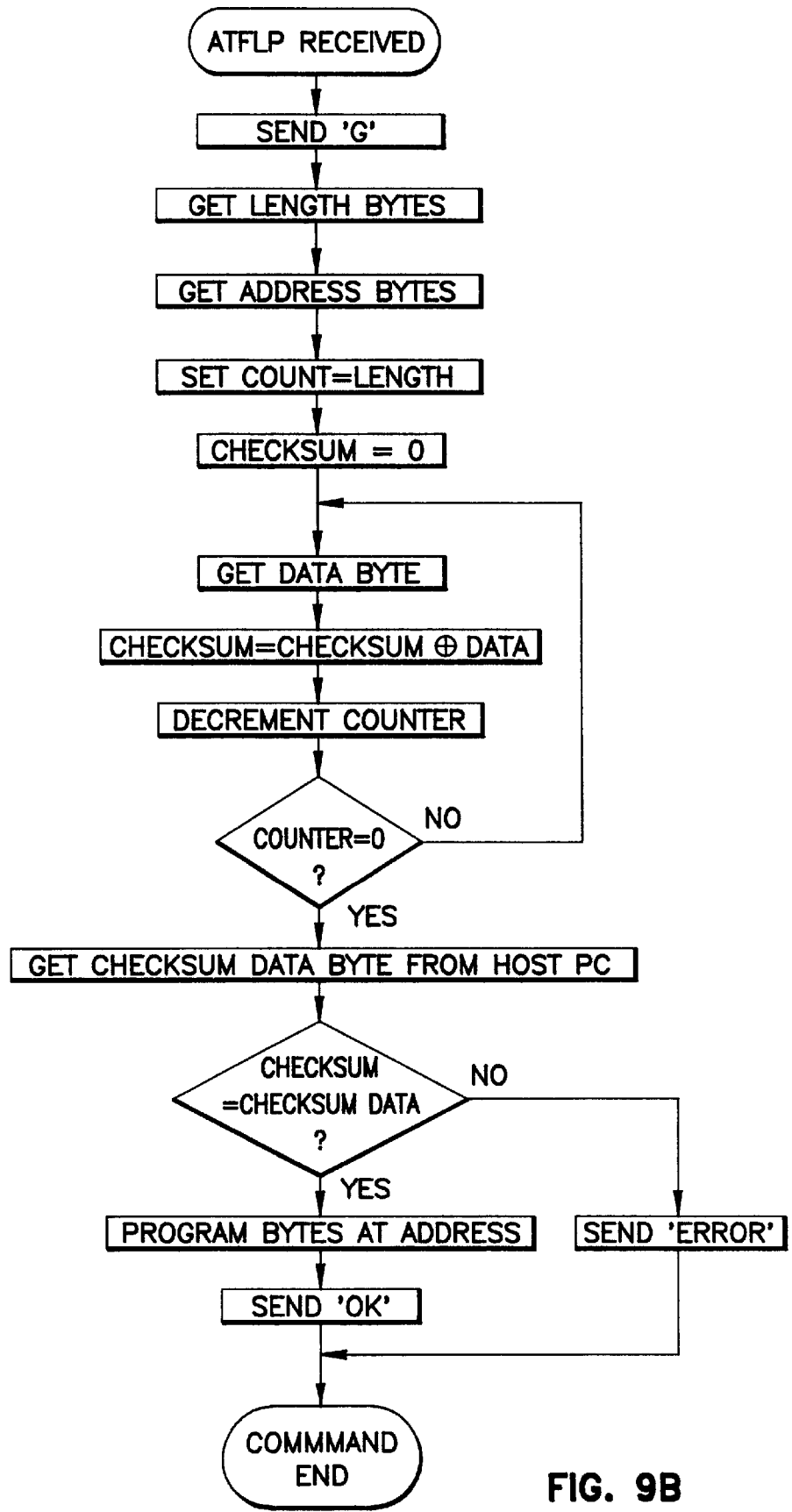

FIGS. 9A and 9B show a flow diagram of the boot control program. FIGS. 9A and 9B show the same programming procedure as described above with respect to FIGS. 8A–8C, except that FIGS. 8A–8C were described from the perspective of the host PC and FIG. 9A and 9B are described from the perspective of the modem. The program begins with power up or AT*FS. At this point the modem copies the program code into RAM The boot control program is run out of RAM while the flash PROM is reprogram. This is because certain bits in flash PROM U4 are toggled during reprogramming and therefore the boot control program must be copied to RAM to avoid corruption of the boot control code.

Next the handshaking protocol described above with respect to FIG. 8C is performed. The modem initializes a counter for 30 milliseconds. If the modem receives an 'M' from the host PC, the modem responds with a 'U'. If no 'M' is received, the counter is decremented. The loop will timeout after 30 ms if no 'M' is received. The number of times through the loop is dependent on the crystal speed of the modem, but is equivalent to 30 milliseconds.

When the 'M' is received and the 'U' response is sent, another counter is initialized to 300 milliseconds. If a 'D' is received from the host PC within the 300 ms timeout, the modem responds with a 'J', 'K' or an 'M', depending of the baud rate at which the modem can run.

The host PC then sends either 'I', 'J', 'K', 'L' or M and both the host PC and the modem configure their baud rates according to the negotiated speed.

Figure 9C:
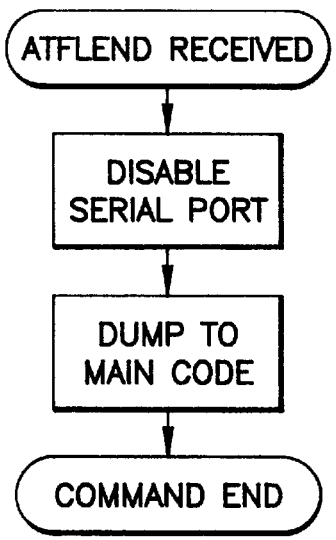
Figure 9D:
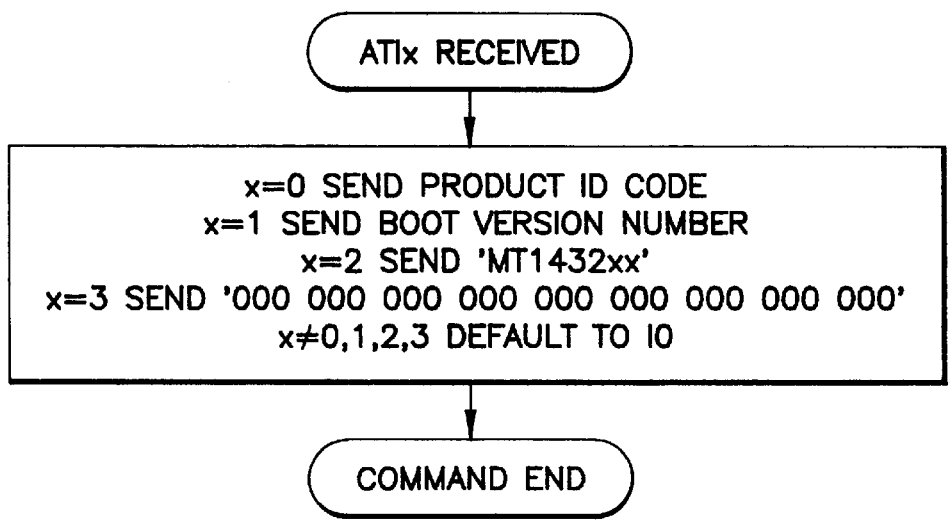

The AT commands ATFLP, ATFLEND or ATIx can now be received by the modem. Flow diagrams showing the programming procedures on receipt of these commands are shown in FIGS. 9B–9D.

FIG. 9B shows the control flow upon receipt of the ATFLP command. The modem first responds with a 'G' to indicate that the ATFLP command was received. Next the packet length bytes and programming address bytes are received from the host PC. A counter is initialized to the length of a packet, and the checksum is initialized to 0.

The modem next runs through a loop, getting each data byte and calculating a new checksum by XOR'ing the checksum from the previous iteration through the loop with the data received. The modem continues through the loop, decrementing the counter each iteration until the count equals 0, indicating that the entire packet was received.

Next, the modem receives the checksum data byte which was generated by the host PC. If the checksum data byte generated by the host PC is equal to the checksum generated by the modem, the data bytes are programmed into the programming address sent with the packet into the flash PROM and an 'OK' response is sent to the host PC. If the checksums are not equal, an error message is sent to the host PC.

FIG. 9C shows the flow diagram for the ATFLEND command. As discussed above, the ATFLEND command occurs when programming of the flash PROM is completed. If the command ATFLEND is received, the serial port is disabled and a jump to the normal modem code is performed.

FIG. 9D shows other commands ATIx, where x=0, 1, 2 or 3. ATI0 commands the modem to respond with a product identification code. ATI1 commands the modem to respond with a boot version number, which is the version of the boot control program installed in the modem. The boot version number is important because different versions may require different packet lengths.

ATI2 is for identification of a basic modem or hardware platform. MT1432xx indicates a derivative of the basic MT1432 platform, for example. These could become more specific to facilitate a more intelligent host interface. AFI3 can be used to indicate country, special defaults, or for future expansion of making a smarter PC host interface.

It is to be understood that the above description is intended to be illustrative, and not restrictive. Many other embodiments will be apparent to those of skill in the art upon reviewing the above description. Although the above inventions have been described in connection with a PCMCIA modem, it should be apparent that the temperature compensating and current limiting techniques could be used to advantage on a wide array of data transfer applications. The scope of the invention should, therefore, be determined with reference to the appended claims, along with the full scope of equivalents to which such claims are entitled.

What is claimed is:

1. A modem for connecting a computer to a telephone line, the modem comprising:
   a data pump;
   a telephone line interface, connected to said data pump, the telephone line interface, including a current-limited loop holding circuit, the current-limited loop holding circuit including a constant current source in series with a DC holding circuit;
   memory means for storing program code; and
   control means, connected to said data pump and said memory means, for executing the program code to control transfers between said data pump and said telephone line.

2. The modem of claim 1, wherein the current-limited loop holding circuit limits current drawn from the telephone line to above about 22 milliamperes.

3. The modem of claim 1, wherein the current-limited loop holding circuit limits current drawn from the telephone line to below about 35 milliamperes.

4. The modem of claim 1, wherein the current-limited loop holding circuit limits current drawn from the telephone line to above about 22 milliamperes and below about 35 milliamperes.

5. The modem of claim 1, wherein the constant current source includes a voltage regulator and a resistor.

6. The modem of claim 5, wherein the current-limited loop holding circuit limits current drawn from the telephone line to above about 22 milliamperes.

7. The modem of claim 5, wherein the current-limited loop holding circuit limits current drawn from the telephone line to below about 35 milliamperes.

8. The modem of claim 5, wherein the current-limited loop holding circuit limits current drawn from the telephone line to above about 22 milliamperes and below about 35 milliamperes.

* * * * *